United States Patent [19]

Kent

[11] Patent Number: 5,220,136

[45] Date of Patent: Jun. 15, 1993

[54] CONTACT TOUCHSCREEN WITH AN IMPROVED INSULATED SPACER ARRANGEMENT

[75] Inventor: Joel C. Kent, Fremont, Calif.

[73] Assignee: Elographics, Inc., Freemont, Calif.

[21] Appl. No.: 798,664

[22] Filed: Nov. 26, 1991

[51] Int. Cl.⁵ .............................................. G08C 21/00
[52] U.S. Cl. ............................................................ 178/18
[58] Field of Search ..................................... 178/18, 19

[56]  References Cited

U.S. PATENT DOCUMENTS

| | | | |
|---|---|---|---|
| 3,798,370 | 3/1974 | Hurst | 178/18 |
| 3,911,215 | 10/1975 | Hurst et al. | 178/18 |
| 4,071,689 | 1/1978 | Talmage et al. | 178/18 |
| 4,220,815 | 9/1980 | Gibson et al. | 178/18 |
| 4,484,038 | 11/1984 | Dorman et al. | 200/5 A |
| 4,659,873 | 4/1987 | Gibson et al. | 178/18 |
| 4,661,655 | 4/1987 | Gibson et al. | 178/18 |
| 4,687,885 | 8/1987 | Talmage, Jr. et al. | 178/18 |
| 4,731,508 | 3/1988 | Gibson et al. | 178/18 |
| 4,777,328 | 10/1988 | Talmage, Jr. et al. | 178/18 |
| 4,797,514 | 1/1989 | Talmage, Jr. et al. | 178/18 |
| 4,801,771 | 1/1989 | Mizuguchi et al. | 178/18 |
| 4,822,957 | 4/1989 | Talmage, Jr. et al. | 178/18 |
| 5,010,213 | 4/1991 | Moriwaki et al. | 178/18 |

*Primary Examiner*—Stafford Schreyer
*Attorney, Agent, or Firm*—Jeffrey G. Sheldon

[57]  ABSTRACT

A contact sensor comprises a first sheet of flexible material and second sheet. The first sheet is capable of being energized to establish an electrical potential thereon. The second sheet can be energized to establish an electrical potential in juxtaposition with the first sheet. The two sheets are formed of materials that tend to stick together. To keep the sheets apart, a plurality of substantially uniform discrete insulating islands are used. By the use of a non-square insulating island spacing pattern with the island spacing satisfying rigorous criteria, the two sheets can be prevented from sticking together without unduly increasing the amount of force required to activate the device. The sensor is particularly useful as a transparent touchscreen.

26 Claims, 3 Drawing Sheets

PRESSURE TO ACTIVATE(NORMALIZED) VS. INVERSE ASPECT RATIO
a/b

CONTACT TOUCHSCREEN WITH AN IMPROVED INSULATED SPACER ARRANGEMENT

BACKGROUND

The present invention relates to electrographic sensors, and particularly contact sensors.

Contact sensors, and particularly touchscreens, are becoming a popular input device for computers. Touchscreens allow people who have never used a computer before to easily interact with the computer. They are finding use in cars, airports, factories, shopping malls, hospitals, training centers, banks, grocery stores, libraries, and pharmacies. Common applications are automatic bank tellers, point of sale systems, and information systems found in airports for providing directions to various locations or information regarding local hotels.

One common type of touchscreen is an electrographic touchscreen or sensor of the type described in U.S. Pat. No. 4,220,815, which is incorporated herein by this reference. Such a screen typically comprises a first sheet of flexible material capable of being energized to establish an electrical potential. The sensor also has a second sheet capable of being energized to establish an electrical potential in juxtaposition with the first sheet. By pressing on the first sheet with a stylus or finger, selected portions of the two sheets come together, thereby generating an electrical signal corresponding to the locus of the portion of the flexible sheet pressed. In order to keep the two sheets separated when they are not pressed, a plurality of discrete insulating buttons or islands are provided. The islands are sized and located so pressure on the first sheet results in the two sheets contacting.

A problem of contact sensors is that the two sheets can occasionally remain in contact when the pressure is removed, i.e., the two sheets stick together. This sticking renders the device on which the sensor is being used inoperative. Such sticking can result from environmental conditions, such as high temperature and/or humidity, manufacturing defects, and the cohesive forces of the material selected.

Sticking is a serious and costly problem. Often the entire sensor needs to be replaced when sticking occurs. Moreover, the entire machine using the sensor is down and inoperative until the problem has been solved. Further, much user ill can occur when a computer system does not operate because of a defective touchscreen.

Much scientific effort has been directed to this problem. Among the solutions considered have been changing the size and/or material of the insulating islands, roughening the surface of the various sheets, changing the materials of the sheets, and providing special coatings on the sheets. None of these solutions has been totally satisfactory, either not working, or being expensive or difficult to implement.

Accordingly, there is a need for a touchscreen that has all the attributes of commercially available touchscreens, namely ease of use, without the sticking problem that plagues many of the touchscreens currently on the market.

SUMMARY

The present invention is directed to a touchscreen, or electrical sensor, that satisfies this need. The sensor comprises a transparent substrate sheet and a transparent cover sheet. The transparent substrate has a top face, a bottom face, and a first transparent conductive layer on the top face. The transparent cover sheet is above the first conductive layer with a gap between the cover sheet and the substrate. The cover sheet has a top surface, a bottom surface, and a second transparent conductive layer on the bottom surface. The cover sheet is sufficiently flexible that selected portions of the second conductive layer can be pressed into contact with corresponding portions of the first conductive layer of the substrate for generation of electrical signals corresponding to the portions of the cover sheet pressed.

In one version of the invention, one of the conductive layers can be more conductive than the other, with the less conductive layer being considered to be a "resistive" layer. In this version of the invention, electrical means can be provided to generate orthogonal electrical fields in one of the layers, typically the resistive layer.

In a second version of the invention, the two conductive layers can have substantially the same conductivity. In this version of the invention, means are attached to each of the layers to produce an electrical field in each layer, the two electrical fields being orthogonal to each other.

A plurality of insulation islands are distributed in the gap between the cover sheet and the substrate to maintain the gap in the absence of pressure on the cover sheet. The present invention is based on the discovery that by proper spacing of the islands, the sticking problem is significantly reduced, without an undue increase in the force required to press the two sheets together.

In particular, at least a portion of the insulation islands are distributed in an array having a repeating pattern so that the ratio of (i) the distance between each insulation island of said portion and its closest neighbor to (ii) the diameter of the repeating pattern is less than 0.65, and preferably less than 0.6. The term "diameter of the pattern" refers to the diameter of the largest circle that can be drawn in the pattern where the circle contains no insulation islands in its interior.

For example, the islands can be placed in an array with a repeating rectangular pattern, the rectangles having a length (l) and a width (w). The closest neighbor island is a distance (w) away. The diameter of the pattern is equal to the diagonal of the rectangle, a distance "d" apart. Thus, in such a configuration the ratio between the width (w) and the diameter (d) of the pattern, i.e., the diagonal of the rectangle, is less than 0.65, and preferably less than 0.6. In a rectangular configuration, preferably the ratio of the width (w) to the length (l) is less than 0.85, and more preferably less than 0.75.

The islands cannot be in a square configuration. The islands can be in configurations other than rectangular, such as any parallelogram (which includes a rectangle), or hexagonal or honeycomb.

Thus the sticking problem can be significantly reduced without increasing the cost of the touchscreen, and without unduly increasing the amount of force required to activate the touchscreen.

DRAWINGS

These and other features, aspects, and advantages of the present invention will become better understood from the following description, appended claims, and accompanying drawings where:

DESCRIPTION

Figure 1:
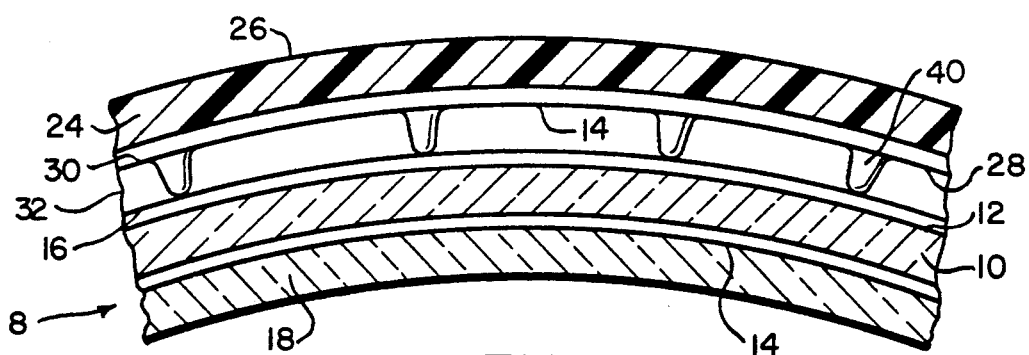
FIG. 1 is a partial sectional view of an improved sensor according to the present invention.

The present invention is described with reference to a sensor or touchscreen 8 illustrated in FIG. 1, which dimensions are exaggerated to better show the components. The basic components of the device of FIG. 1 are similar to those described in U.S. Pat. Nos. 4,220,815; 4,659,873, and 4,661,655, all of which are incorporated herein by this reference. However, as described in detail below, this invention is applicable to touchscreens having a structure different than that of FIG. 1, and thus the present invention is not limited to sensors having the configuration of sensor 8.

With reference to FIG. 1, the electrographic contact sensor 8 comprises a base element or substrate 10 having a top surface 12, a bottom surface 14, and a resistive layer 16 on the top surface. The substrate can be planar, or can be contoured to match the face of a curved object such as a conventional video display screen or cathode ray tube 18 associated with data processing or the like. The substrate 10 can have any perimeter configuration, e.g., rectangular, to match the configuration of a video display. The substrate 10 can typically be rigid plastic, glass, various types of printed circuit board material, or a metal having a previously applied insulating layer. Furthermore, various plastic materials can be utilized in the form of a flexible sheet and supported upon a suitable hard surface material.

For a touchscreen, the substrate 10 is substantially transparent, and the resistive coating 16 on the substrate is likewise substantially transparent. As described in U.S. Pat. No. 4,071,689, a substantially transparent resistive layer 16 is typically a semiconducting metal oxide such as an indium-tin oxide, or less preferably tin oxide or tin antimony oxide. Coated substrates of indium-tin oxide are available, for example, from Liberty Mirror, Brackenridge, Pa. This resistive layer 16 has a highly uniform resistivity which can be a selected value in the range of 10 to 10,000 ohms per square.

Spaced a small distance from the resistive layer 16 is a transparent cover sheet 24 having a top surface 26 and a bottom surface 28. The bottom surface 28 has a conductive layer 30 thereon. There is a gap 32 between the conductive layer 30 and the resistive layer 16.

If the resultant device is to be transparent such as for a touchscreen, conductive layer 30 and the cover sheet 24 need to be transparent. Transparency is not required for a device that is an opaque sensor. The flexible film or cover sheet 24 can either be a rigid-like plastic such as polyester, or polycarbonate, or it can be elastomeric. The cover sheet 24 can be a thermal formable polyester plastic or polyvinylchloride, having a thickness of about 0.005 inch (0.125 mm).

The substantially transparent conductive layer or coating 30 can be a deposit of gold or gold-nickel having a resistivity typically of about 10 to 40 ohms per square. Alternatively, a conductive indium-tin oxide layer can be applied by conventional vacuum deposition techniques by, for example, Evaporated Metal Films, of Ithaca, N.Y. The cover sheet 24 can also be a fabric layer as described in U.S. Pat. No. 4,659,873.

Although the present invention is principally directed to transparent touchscreens, the invention is applicable to opaque products and translucent products. If the product is to be an opaque sensor, the resistive layer 16 can be applied by screening a resistive ink, by applying a resistive paint upon the substrate 10 by spraying or other coating technique, or the layer can be a volume conducting sheet such as rubber or plastic.

In opaque units, the resistive coating typically has a sheet resistivity from about 10 to about 10,000 ohms per square and is applied within a variation of uniformity of about 2% and 25%, depending upon the positional accuracy requirements of the device 8.

If transparency is not of concern, the conductive and resistive layers can be formed of silver, copper, or nickel.

The cover sheet 24 is sufficiently flexible that selected portions of the conductive layer 30 can be depressed into contact with corresponding portions of the resistive layer 16, i.e., close the gap 32, for generation of signals corresponding to the portions of the cover sheet pressed.

The terms "conductive layer" and "resistive layer" are used only with regard to the relative conductivity of layers 16 and 30. In view of the relatively low resistivities of both layers, both can be considered to be "conductive" layers, and are referred to as such in the claims. Moreover, is not necessary that the resistive layer be on the substrate and the conductive layer be on the cover. It is within the scope of the present invention for the resistive layer to be on the cover, and the conductive layer to be on the substrate.

The resistive layer 16 and the conductive layer 30 are spaced apart by a plurality of small insulator islands 40. The insulators 40 are sized and spaced to minimize the separation distances between the resistive layer 16 and conductive layer 30, to avoid inadvertent contact therebetween, and yet permit contact therebetween by small applied pressure of a fingertip or small object. Typically the islands have a height of about 0.0005 to about 0.015 inch. The islands are typically from about 0.002 to about 0.02 inch (0.05–0.5 mm) across. The spacing of the islands is critical to the present invention, as described below. All spaces between islands are measured from center to center.

These insulators islands 40 can be composed of any suitable insulating material. Once such material is ultraviolet curing ink, which can be positioned using conventional silkscreen or photographic techniques. A typical ink for this purpose is "Solex" distributed by Advance Exello, Chicago, Ill. The islands 40 can be attached to the conductive layer 30, as shown, or to the resistive layer 16.

Although not shown, electrical means are provided to apply orthogonal electric potentials to the resistive layer 16. Alternatively, the orthogonal electrical potentials can be applied to the conductive layer 30. Many such means are known in the art such as those of Talmage, et al. as described in U.S. Pat. No. 4,071,689, and of S. H. Cameron, et al., as described in U.S. Pat. No. 3,449,516. Both of these patents are incorporated herein by this reference. In general, these electrical means involve space-apart small electrodes attached to the resistive layer 16 along the edges thereof and circuits connected to each electrode so that each electrode along an edge has substantially the same potential, and the potential is switched in an orthogonal manner. The positioning of the small electrodes is such that electric field lines generated in the resistive layer, as a result of the applied potentials, project on to a planar surface so as to define a rectilinear coordinate system. The leads from the electrode (not shown) in the present device leave the sensor through a cable (not shown).

In an alternate version of the invention, the two layers 16 and 30 can have substantially the same conductivity. In this version of the invention, electrical means are provided to apply an electrical potential to each layer, the two electrical potentials being orthogonal to each other. A product having this structure is described in U.S. patent application Ser. No. 07/603,420, filed Oct. 26, 1990, for Ultralinear Touchscreen, by Elographics, Inc. In this configuration, the two conductive layers are formed of indium-tin oxide with a resistivity typically of 150 ohms per square.

It has been discovered that two important parameters relating to the effectiveness of operation of the sensor 8 relate to the spacing between the insulator islands 40. It has been discovered that the closer the islands are together, in particular the closer each island is to its nearest neighbor island, the less likely it is for the resistive (or conductive) layer 16 and the conductive layer 30 to remain stuck together when the gap is closed, i.e., the "sticky" problem. Contrarily, the farther apart each island 40 is from its nearest neighbor, the less force required to close the gap 32 between the resistive layer 16 and the conductive layer 30. Another factor that can affect the performance of the sensor 8 is the responsiveness of the sensor to "drag", i.e., does the device 8 correctly track a finger or other activating device as it is dragged across the outer surface 26 of the cover sheet 24? In general, the less force required to activate the sensor 8, the better the performance of the device 8 with regard to drag.

It has been discovered that the conflicting requirements of non-sticking and low force to activate, as well as good drag performance, can be accommodated by having a non-square configuration of the insulator islands. In particular, at least a portion of the insulator islands, and preferably all of the insulator islands, are distributed in an array having a regular repeating pattern, so that the ratio of (i) the distance between each insulation island and its closest neighbor to (ii) the diameter of the pattern is less than 0.65, and preferably less than 0.6. Preferably the insulation islands are uniformly distributed in the regularly repeating pattern across the entire sensor.

Figure 2:
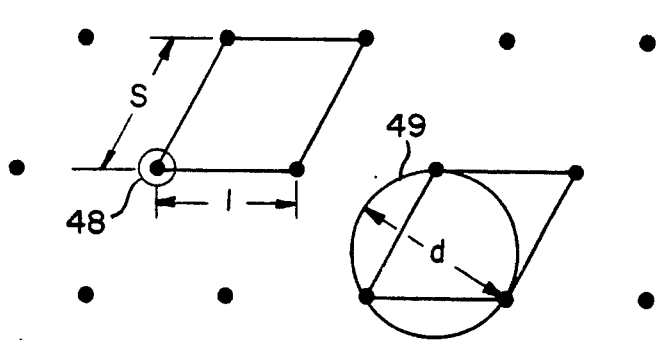
FIGS. 2-5 show various patterns for the insulator islands according to the present invention.

Examples of various suitable configurations for arrays of the insulator islands are shown in FIGS. 2-5. For example, FIG. 2 shows an array having a parallelogram pattern where each parallelogram has one side of length "o" and another side of length "l". With regard to island 48 (which is circled) in FIG. 2, the distance between that island and its closest neighbor is distance "s"; the distance is the diameter of the pattern, as shown by circle 49. According to the present invention, the ratio of s:d is less than 0.65, and preferably less than 0.6. As shown in FIG. 2, the circle 49 contains no islands in its interior, but is does have islands on its perimeter.

Figure 3:
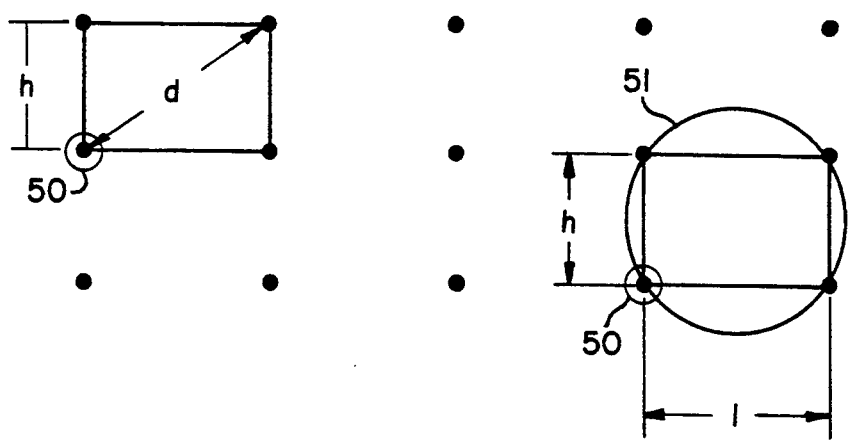

FIG. 3 shows the insulator islands in a rectangular array, each rectangle having a length "l" and a height "h". The array in FIG. 3 is a special case of the array in FIG. 2, where the corner angles of the parallelogram of FIG. 2 are all 90°. In the array of FIG. 3, the distance between the circled island 50 and its closest neighbor is "h", while the distance between island 50 and its farthest away neighbor is "d", this distance being the diagonal of the rectangle, which is the diameter of the pattern, as shown by circle 51. The ratio of h:d is less than 0.65, and preferably less than 0.6. Preferably the ratio of h:l is less than 0.85, and more preferably less than 0.75. It is believed a well-performing rectangular array has a length l of 0.180 inch and a height h of 0.130 inch.

Figure 4:
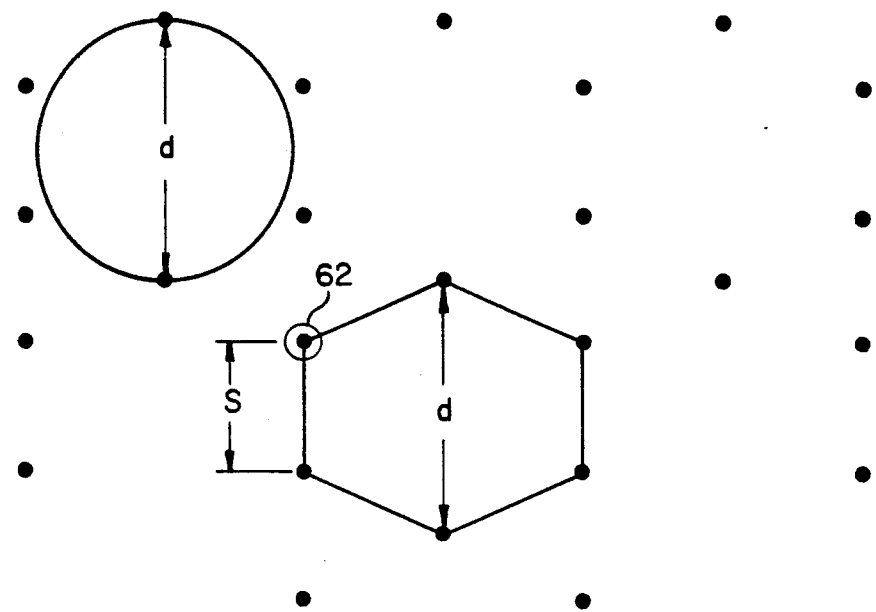

FIG. 4 shows an array having a hexagonal or honeycomb pattern. In this configuration, the distance between the circled island 62 and its closest neighbor is "s", and the diameter of the pattern is d. According to the present invention the ratio of s:d is less than 0.65, and preferably less than 0.6.

It is believed that a honeycomb pattern with a good balance between sticking and pressure to activate can be achieved by having all of the side walls of the honeycomb be equal in length, with s equal to about 0.0885 inch.

Figure 5:
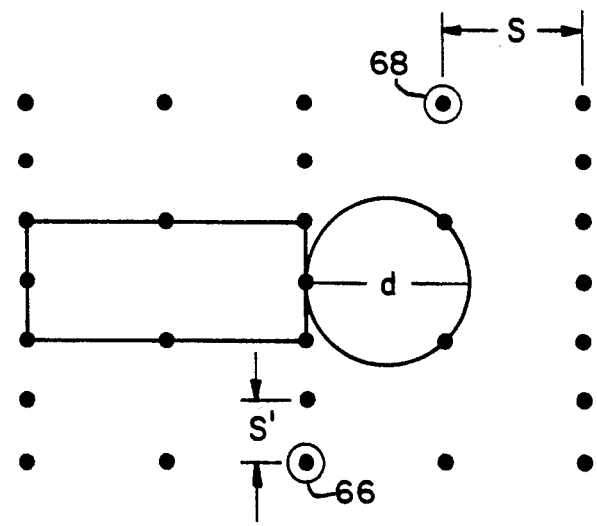

FIG. 5 shows an array of islands in a generally rectangular configuration, with an extra insulation island in each side of the rectangle. The closest neighbor to island 66 is a distance "s" away, and the diameter of the pattern is "d". Thus, the critical ratio is s:d. For insulator island 68, the distance to the closest neighbor is "s'". The critical ratio for island 68 thus is s':d, and this ratio needs to be less than 0.65. Thus, for some patterns, the critical ratio is not the same for all islands.

In use, the device 8 can be activated with any device providing a force to close the circuit, such as a pen or such as a finger or a resistive probe.

The dimensions given with respect to distance between insulator islands is based on a center to center measurement. When the measurements are with regard to insulation islands that are placed on curved surfaces, the measurement is with regard to the dimension along the surface. Since the preferred method of forming insulation islands is with a silkscreen or similar process, when a silkscreen template is formed, it is formed as a planar element, and the measurements are actually in a plane. However, since the degree of curvature typical with electrographic sensors is generally relatively small, the difference between measuring along a planar surface and a curved surface is relatively insignificant.

The following examples demonstrate advantages of the present invention.

EXAMPLE 1

Sensors having the configuration of the sensor 8 of FIG. 1 were constructed using various rectangular dot patterns. Each sensor had a 0.125 inch thick substrate of glass film available from Donnely Company of Holland, Mich., coated with a resistive layer of indium-tin oxide. The top sheet 24 was 0.007 inch thick polyester film. The conductive layer 30 was made of nickel-gold. The insulating islands were formed from WR Grace Sm 3400 solder-mask, and applied using a screen of various spacings identified in Table 1. Each insulating island was about 0.001 inch in height and had a diameter at its base of about 0.010 inch.

With regard to each test sensor, the force to activate the device was measured, as well as the tendency of the device to stick. The force to activate was measured with an electronic force gauge mounted horizontally on a linear ball slide. The ball slide and force gauge were mounted on a common chassis. A screw mechanism was used to advance the forge gauge towards the touchscreen until the gap between the resistive layer and conductive layer was closed.

The tendency to stick was determined by aging specimens for 15 days at 35° C. and 95% relative humidity. Using a roller, the conductive layer was rolled into contact with the resistive layer, and the tendency to stick was visually observed. This roller sticking test was conducted every five days during the 15-day aging process.

Figure 6:
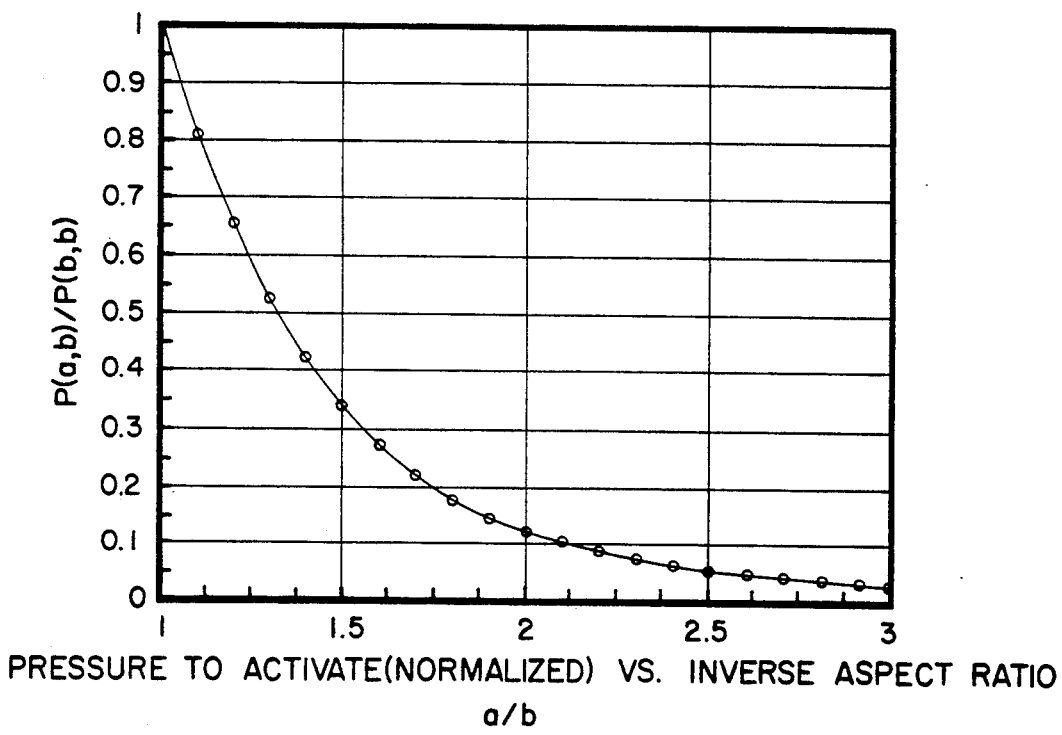
FIG. 6 is a plot of the pressure to activate a touchscreen having a rectangular dot pattern (the pressure being normalized for a corresponding square dot pattern), versus the aspect ratio of the rectangle.

The force to activate was determined for each specimen at five separate locations, and the average of the five locations was determined. These results are presented in Table 1.

$$\frac{P(a, b)}{P(b, b)} = \frac{P_{act} b^4}{P_o b^4} \quad (1)$$

where
P(a,b)/P(b,b) is the same as in FIG. 6;
$P_{act}$ is the pressure to activate for a rectangular dot pattern b,a; and
$P_o$ is a sured pressure to activate for a square dot pattern with spaces.

According to this example, it is known that an aspect ratio (b/a) of 0.72 is desired to minimize stickiness. It is

TABLE 1

| EXAMPLE | PATTERN | h/l[3] | h/d[4] | % Sticking | Force to Activate (OZ) |
|---|---|---|---|---|---|
| 1 | 0.16 × 0.16 square | 1 | 0.71 | 100 (16/16)[1] | 2.66 |
| 2 | 0.16 × 0.12 rectangle | 0.75 | 0.6 | 25 (3/12) | 4.34 |
| 3 | 0.16 × 0.1 rectangle | 0.63 | 0.53 | 0 (0/12) | 4.89 |
| 4 | 0.16 × 0.08 rectangle | 0.5 | 0.45 | 0 (0/14) | 4.98 |
| 5 | 0.16 × 0.16 square[2] | 1 | 0.71 | 0 (0/14) | 7.9 |
| 6 | 0.105 × 0.189 rectangle | 0.56 | 0.49 | 0 (0/11) | 2.55 |

[1]Refers to number of samples, and number that stick
[2]Squares with extra island at center of square
[3]h/l — ratio of height to length
[4]h/d — ratio of height to diameter of pattern, which for all these patterns is the diagonal of the pattern.

Comparison of the results of Example 1 against those of Examples 2, 3, 4, and 6 shows that by reducing the critical ratio to less than about 0.65, substantial reduction in sticking is achieved compared to an ordinary square configuration. Comparison of the results of Examples 2, 3, 4, and 6 against those of Example 5 shows that reducing the critical ratio to less than about 0.65 results in a substantially lower force to activate. Comparison of the results of Example 1 against those of Example 6 demonstrates that the present invention reduces sticking without an increase in the force to activate.

EXAMPLE 2

This Example demonstrates how to custom design a dot pattern, based on a theory developed regarding the pressure required to activate rectangular and square configurations. The custom design is based on a curve derived from these theoretical calculations. With reference to FIG. 6, there is shown a plot of the pressure to activate a rectangle versus the aspect ratio a/b of the rectangle, where:

P(a, b) = the pressure to activate for a rectangle having a length = a and a height = b; and
P(b, b) = the pressure to activate a square dot pattern where a = b.

The "pressure to activate" is the maximum pressure on the cover sheet to bring the conductive layer 30 into contact with the resistive layer 16. The curve of FIG. 6 is based on theoretical calculations where it has been determined that the pressure to activate a rectangle decreases with the fourth power of the height b for a rectangle with a fixed aspect ratio (b/a). In other words, as the height b of the rectangle increases, the pressure decreases with the fourth power of b.

This theory supports the following equation:

also known that a square dot pattern of 0.160 inch per side has a satisfactorily low pressure to activate. From the above equation and FIG. 6, it is possible to specify a rectangular pattern that has about the same pressure to activate as the square of 0.16 inch per side, the rectangle having an aspect ratio of 0.72.

In particular, in equation (1) above, it is known that the desired pressure to activate ($P_{act}$) is equal to $P_o$, the pressure to activate for the square dot pattern having desired aspect ratio)=1.39. From FIG. 6, this gives a P(a,b)/P(b,b) equal to about 0.43. Substituting into Equation 1 above yields:

$0.43 = b^4/(0.160)^4$, which yields that $b = 0.13$.

Since the aspect ratio is 0.72, a=0.13/0.72 which =0.18.

Therefore, the insulators should be in an array having a rectangular pattern of 0.13×0.18.

EXAMPLE 3

This example demonstrates how the "stickiness" of rectangular pattern can be determined relative to the stickiness of a different rectangular pattern. It is based upon the determination that the stickiness of a rectangular pattern is inversely proportional to the fourth power of the minimum distance between the insulation islands of the pattern, which is the width of a rectangle. Accordingly, from the results of Example 2, it can be determined that by changing from a square dot pattern of 0.16×0.16 to a rectangular dot pattern of 0.13 to 0.18, the relative amount of stickiness is decreased by a factor of $(0.13/0.16)^4 = 0.44$, which means the stickiness is decreased by over 50 percent.

The present invention has significant advantages. It solves the problem of sticking, without increasing the force to activate so much that the device is no longer useful. Moreover, it accomplishes this in an economical way that does not require any change of materials or any change of fabrication process.

Although the present invention has been described in considerable detail with reference to certain preferred versions thereof, other versions are possible. For example, the present invention is not limited to electrographic sensors, but can be used for any sensor comprising spaced apart sheets that are intermittently pressed together. Therefore, the spirit and scope of the appended claims should not be limited to the description of the preferred versions contained herein.

What is claimed is:

1. A sensor comprising:
   a) a substrate having a top face, a bottom face, and a first conductive layer on the top face;
   b) a cover sheet above the first conductive layer with a gap between the cover sheet and the substrate, the cover sheet having a top surface, a bottom surface, and a second conductive layer on the bottom surface, wherein the cover sheet is sufficiently flexible that selected portions of the second conductive layer can be pressed into contact with corresponding portions of the first conductive layer of the substrate for generation of signals corresponding to the portions of the cover sheet pressed; and
   c) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is less than 0.65,
   wherein the diameter of the pattern is equal to the diameter of the largest circle that can be drawn in the pattern where said circle contains no insulation islands in its interior.

2. An electrographic contact sensor for disposing upon a data-containing surface so as to permit generation of electrical signals corresponding to x- and y-coordinates of any portion of the data, the sensor comprising:
   a) a transparent substrate having a top face and a bottom face, with a transparent resistive layer on the top face, the bottom face being shaped and sized for placement on the data-containing surface;
   b) means attached to the resistive layer for connecting to an electrical circuit to produce orthogonal electrical fields in the resistive layer;
   c) a transparent cover sheet above the resistive layer with a gap between the cover sheet and the substrate, the cover sheet having a top surface and a bottom surface with a transparent conductive layer on the bottom surface, wherein the cover sheet is sufficiently flexible that selected portions of the conductive layer can be pressed into contact with corresponding portions of the resistive layer of the substrate for generation of electrical signals corresponding to the portions of the cover sheet pressed, and wherein the cover sheet and the substrate are formed of materials that can stick together; and
   d) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is a sufficient amount less than 0.65 that the cover sheet and the substrate do not stick together;
   wherein the diameter of the pattern is equal to the diameter of the largest circle that can be drawn in the pattern where said circle contains no insulation islands in its interior.

3. An electrographic contact sensor for disposing upon a data-containing surface so as to prevent generation of electrical signals corresponding to x- and y-coordinates of any portion of the data, the sensor comprising:
   (a) a transparent substrate having a top face and a bottom face, with a first transparent conductive layer on the top face, the bottom face being shaped in size for placement on the data-containing surface;
   (b) a transparent cover sheet above the first transparent conductive layer with a gap between the cover sheet and the substrate, the cover sheet having a top surface and a bottom surface with a second transparent conductive layer on the bottom surface, wherein the cover sheet is sufficiently flexible that selected portions of the second conductive layer can be pressed into contact with corresponding portions of a first conductive layer of the substrate for generation of electrical signals corresponding to the portions of the cover sheet pressed, and when the cover sheet and the substrate are formed of materials that can stick together;
   (c) means attached to the first conductive layer for connecting to an electrical circuit to produce a first electrical field in the first conductive layer;
   (d) means attached to the second conductive layer for connecting to an electric circuit to produce in the second conductive layer a second electrical field that is orthogonal to the first electrical field; and
   (e) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is a sufficient amount less than 0.65 that the cover sheet and the substrate do not stick together;
   wherein the diameter of the pattern is equal to the diameter of the largest circle that can be drawn in the pattern where said circle contains no insulation islands in its interior.

4. The sensor of claim 1 wherein the first conductive layer and the second conductive layer have different conductivities.

5. The sensor of claim 1 or 3 when the first conductive layer and the second conductive layer have substantially the same conductivity.

6. The sensor of claim 1 wherein the first conductive layer and the second conductive layer have substantially the same conductivity, and the sensor includes means attached to both conductor layers for connecting to an electrical circuit to produce an electrical field in both conductive layers, the electrical fields being orthogonal to each other.

7. The sensor of claim 1, 2, or 3 wherein substantially all of the insulation islands are distributed in the array having a repeating pattern.

8. The sensor of claim 1, 2, or 3 wherein the insulation islands are uniformly distributed.

9. The sensor of claim 1, 2, or 3 wherein the repeating pattern is rectangular, the rectangles having a length and a width, the ratio of the width to the length of the rectangle being less than 0.85.

10. The sensor of claim 1, 2 or 3 wherein the ratio of (i) the distance between each insulation island of said portion and its closest neighbor to (ii) the diameter of the repeating pattern is less than 0.6.

11. The sensor of claim 9 wherein the repeating pattern is rectangular, the rectangles having a length and a width, the ratio of the width to the length of the rectangle being less than 0.75.

12. The sensor of claim 1 wherein the repeating pattern is a parallelogram pattern.

13. The sensor of claim 1 wherein the repeating pattern is a hexagonal pattern.

14. The sensor of claim 2 or 3 wherein the data-containing surface is nonplanar, and the bottom face of the substrate conforms to the nonplanar data-containing surface.

15. The sensor of claim 1, 2 or 3 wherein the insulation islands are integral with the cover sheet.

16. The sensor of claim 1 or 3 wherein the insulation islands are attached to the first conductive layer.

17. The sensor of claim 2 wherein the insulation islands are attached to the conductive layer.

18. The sensor of claim 1, 2, or 3 wherein the insulation islands have a height of about 0.0005 to about 0.015 inch and a diameter of about 0.001 to about 0.02 inch.

19. A cathode ray tube having the sensor of claim 1, 2, or 3 thereon.

20. The sensor of claim 1, 2, or 3 wherein the substrate is a cathode ray tube.

21. The sensor of claim 1, 2, or 3 wherein the substrate is a liquid crystal display.

22. The sensor of claim 1, 2, or 3 wherein the substrate is an electroluminescent display.

23. A discriminating contact sensor that is responsive to a contacting object, the sensor comprising:
 a) a first sheet of a flexible material capable of being enlarged to establish an electrical potential thereon;
 b) a second sheet capable of being energized to establish an electrical potential thereon in juxtaposition with the first sheet, the two sheets being formed of materials that tend to stick together; and
 c) a plurality of substantially uniform discrete insulating islands separating the first and second sheets through at least a portion of the sensor, the islands being sized so that pressure on the first sheet results in the sheets contacting, at least a portion of the insulation islands being distributed in an array having a repeating pattern so that the ratio of (i) the distance between each insulation island and its closest neighbor to (ii) the diameter of the repeating pattern is a sufficient amount less than 0.65 that the two sheets do not stick together,
 wherein the diameter of the pattern is equal to the diameter of the largest circle that can be drawn in the pattern where said circle contains no insulation islands in its interior.

24. A sensor comprising:
 a) a substrate having a top face, a bottom face, and a first conductive layer on the top face;
 b) a cover sheet above the first conductive layer with a gap between the cover sheet and the substrate, the cover sheet having a top surface, a bottom surface, and a second conductive layer on the bottom surface, wherein the cover sheet is sufficiently flexible that selected portions of the second conductive layer can be pressed into contact with corresponding portions of the first conductive layer of the substrate for generation of signals corresponding to the portions of the cover sheet pressed; and
 c) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is less than 0.65,
 wherein the diameter of the pattern is equal to the diameter of the largest circle that can be drawn in the pattern where said circle contains no insulation islands in its interior;
 wherein the repeating pattern is rectangular, the rectangles having a length and a width, the width being about 0.13 inches and the length being about 0.18 inches.

25. An electrographic contact sensor for disposing upon a data-containing surface so as to permit generation of electrical signals corresponding to x- and y-coordinates of any portion of the data, the sensor comprising:
 a) a transparent substrate having a top face and a bottom face, with a transparent resistive layer on the top face, the bottom face being shaped and sized for placement on the data-containing surface;
 b) means attached to the resistive layer for connecting to an electrical circuit to produce orthogonal electrical fields in the resistive layer;
 c) a transparent cover sheet above the resistive layer with a gap between the cover sheet and the substrate, the cover sheet having a top surface and a bottom surface with a transparent conductive layer on the bottom surface, wherein the cover sheet is sufficiently flexible that selected portions of the conductive layer can be pressed into contact with corresponding portions of the resistive layer of the substrate for generation of electrical signals corresponding to the portions of the cover sheet pressed, and wherein the cover sheet and the substrate are formed of materials that can stick together; and
 d) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is a sufficient amount less than 0.65 that the cover sheet and the substrate do not stick together;
 wherein the diameter of the pattern is equal to the diameter of the largest circle that can be drawn in the pattern where said circle contains no insulation islands in its interior;

wherein the repeating pattern is rectangular, the rectangles having a length and a width, the width being about 0.13 inches and the length being about 0.18 inches.

26. An electrographic contact sensor for disposing upon a data-containing surface so as to prevent generation of electrical signals corresponding to x- and y-coordinates of any portion of the data, the sensor comprising:

(a) a transparent substrate having a top face and a bottom face, with a first transparent conductive layer on the top face, the bottom face being shaped in size for placement on the data-containing surface;

(b) a transparent cover sheet above the first transparent conductive layer with a gap between the cover sheet and the substrate, the cover sheet having a top surface and a bottom surface with a second transparent conductive layer on the bottom surface, wherein the cover sheet is sufficiently flexible that selected portions of the second conductive layer can be pressed into contact with corresponding portions of a first conductive layer of the substrate for generation of electrical signals corresponding to the portions of the cover sheet pressed, and when the cover sheet and the substrate are formed of materials that can stick together;

(c) means attached to the first conductive layer for connecting to an electrical circuit to produce a first electrical field in the first conductive layer;

(d) means attached to the second conductive layer for connecting to an electric circuit to produce in the second conductive layer a second electrical field that is orthogonal to the first electrical field; and (e) a plurality of insulation islands distributed in the gap between the cover sheet and the substrate to maintain the gap between the cover sheet and the substrate in the absence of pressure on the cover sheet, at least a portion of the insulation islands being distributed in an array having a repeating pattern so that the ratio of (i) the distance between each insulation island of said portion and its closest neighbor to (ii) the diameter of the repeating pattern is a sufficient amount less than 0.65 that the cover sheet and the substrate do not stick together;

wherein the diameter of the pattern is equal to the diameter of the largest circle that can be drawn in the pattern where said circle contains no insulation islands in its interior;

wherein the repeating pattern is rectangular, the rectangles having a length and a width, the width being about 0.13 inches and the length being about 0.18 inches.

* * * * *

UNITED STATES PATENT AND TRADEMARK OFFICE
CERTIFICATE OF CORRECTION

PATENT NO.  : 5,220,136
DATED       : June 15, 1993
INVENTOR(S) : Joel C. Kent

It is certified that error appears in the above-identified patent and that said Letters Patent is hereby corrected as shown below:

Column 7, Line 22, Table 1, Example 4, "4.98" should read --4.93--

Column 8, Line 10, "sured" should read --measured--

Column 8, Line 11, "spaces" should read --spacing b'--

Column 11, Line 47, "enlarged" should read --energized--

Signed and Sealed this

Seventh Day of June, 1994

Attest:

BRUCE LEHMAN

Attesting Officer            Commissioner of Patents and Trademarks

UNITED STATES PATENT AND TRADEMARK OFFICE
CERTIFICATE OF CORRECTION

PATENT NO. : 5,220,136
DATED : June 15, 1993
INVENTOR(S) : Joel C. Kent

It is certified that error appears in the above-identified patent and that said Letters Patent is hereby corrected as shown below:

Column 13, Line 9, change "prevent" to --permit--

Signed and Sealed this

Twentieth Day of September, 1994

Attest:

BRUCE LEHMAN

Attesting Officer

Commissioner of Patents and Trademarks